US009002401B2

(12) United States Patent
Kang et al.

(10) Patent No.: US 9,002,401 B2
(45) Date of Patent: Apr. 7, 2015

(54) TERMINAL AND METHOD FOR RECOGNIZING COMMUNICATION TARGET

(71) Applicants: Electronics and Telecommunications Research Institute, Daejeon-si (KR); Korea Advanced Institute of Science and Technology, Daejeon-si (KR)

(72) Inventors: Joonhyuk Kang, Daejeon-si (KR); Byung-Jae Kwak, Daejeon-si (KR); Young-Hoon Kim, Daejeon-si (KR); Seung-Chan Bang, Daejeon-si (KR); Eunhye Park, Deajeon-si (KR)

(73) Assignees: Electronics and Telecommunications Research Institute, Daejeon (KR); Korea Advanced Institute of Science and Technology, Daejeon (KR)

( * ) Notice: Subject to any disclaimer, the term of this patent is extended or adjusted under 35 U.S.C. 154(b) by 128 days.

(21) Appl. No.: 13/760,475

(22) Filed: Feb. 6, 2013

(65) Prior Publication Data
US 2013/0203448 A1 Aug. 8, 2013

(30) Foreign Application Priority Data

Feb. 6, 2012 (KR) .................. 10-2012-0012017
Jan. 3, 2013 (KR) .................. 10-2013-0000746

(51) Int. Cl.
*H04W 88/02* (2009.01)
*H04W 4/02* (2009.01)

(52) U.S. Cl.
CPC .................................. *H04W 4/025* (2013.01)

(58) Field of Classification Search
CPC ..... H04W 84/18; H04W 76/02; H04W 8/005; G01S 58/0284; G01C 3/00
USPC ............... 455/556.1, 456.1, 456.3, 566, 457; 701/409, 500, 468; 345/143, 633, 632, 345/642, 158, 620, 629, 630, 645; 715/738, 715/737; 709/205, 227
See application file for complete search history.

(56) References Cited

U.S. PATENT DOCUMENTS

| 7,529,542 | B1 * | 5/2009 | Chevion et al. ............ 455/414.1 |
| 2006/0256959 | A1 * | 11/2006 | Hymes ..................... 379/433.04 |
| 2010/0085318 | A1 * | 4/2010 | Lee et al. ........................ 345/173 |
| 2011/0199917 | A1 | 8/2011 | Karaoguz et al. |
| 2011/0289147 | A1 * | 11/2011 | Styles et al. .................. 709/205 |

* cited by examiner

*Primary Examiner* — Diane Mizrahi
(74) *Attorney, Agent, or Firm* — Nelson Mullins Riley & Scarborough LLP; Anthony A. Laurentano, Esq.

(57) ABSTRACT

A terminal and method for recognizing a communication target within a visible range. The method of a terminal to recognize a communication target includes obtaining location information of a communication target whose identification information is unknown within a visible range of a terminal user; and recognizing a relative location of the communication target with respect to the terminal based on the obtained location information and displaying the recognized relative location of the communication target.

20 Claims, 8 Drawing Sheets

TERMINAL AND METHOD FOR RECOGNIZING COMMUNICATION TARGET

CROSS REFERENCE TO RELATED APPLICATION

This application claims the benefit under 35 U.S.C. §119(a) of Korean Patent Application Nos. 10-2012-0012017, filed on Feb. 6, 2012, and 10-2013-0000746, filed on Jan. 3, 2013, the entire disclosures of which are incorporated herein by references for all purposes.

BACKGROUND

1. Field

The following description relates to location recognition and location-based service provision.

2. Description of the Related Art

With the wide use of global positioning system (GPS)-equipped wireless terminals, such as smartphones, tablet PCs, and the like, an increasing number of various location-based services have been provided. Representative examples of such services are navigation systems that utilize coordinate information obtained in real time from signals from GPS satellites and augmented reality (AR) mobile applications that provide surrounding information. Recently, with the help of an access point (AP) of a wireless local area network (WLAN), the application of location-based services has expanded to radio shadow areas and interior areas where it is not possible to receive GPS signals.

Currently available location-based services store absolute location information of buildings or fixed objects in a database, and unconditionally provide information about buildings and objects around a terminal user based on a location of the terminal. Such conventional service provision methods require service providers to store a massive amount of information in a DB and constantly update changes in surrounding information. In addition, users are not able to obtain information about buildings and objects which are not present in the DB of the service providers. Moreover, it is difficult to provide application services that allow the mutual transmission and reception of information between the user's terminal and other terminals in the proximity of the user based on location information of the other terminals. Furthermore, in pattern matching scheme, in which an image captured by a user is compared with image patterns of objects stored in a DB as communication target candidates and a similarity therebetween is detected, the recognition of images may be difficult since the images are sensitive to lighting and weather conditions.

SUMMARY

Accordingly, in one aspect, there is provided a terminal and method for recognizing a communication target which is present in a visible range of a terminal user and whose identification information is unknown and displaying communication targets in a different manner in a screen so that a desired communication target can be selected by the terminal user and a communication link to the selected communication target is established.

In one general aspect, there is provided a method of a terminal to recognize a communication target, comprising: obtaining location information of a communication target which is located within a visible range of a terminal user and whose identification information is unknown; and recognizing a relative location of the communication target with respect to the terminal based on the obtained location information and displaying the recognized relative location of the communication target.

The obtaining of the location information of the communication target may include calculating an orientation angle between a reference direction and a direction to which the terminal is directed, setting a transmission range based on a reference line of the calculated orientation angle, within which a location information request signal is transmitted, and emitting the location information request signal within the transmission range and receiving the location information of the communication target that has received the emitted request signal.

The setting of the transmission range may include setting a field of view of an image capturing unit of the terminal, which is a field of view of the terminal user and within which the image capturing unit can acquire an image of the communication target, as the transmission range.

The displaying of the recognized relative location of the communication target may include calculating a relative angle of the communication target that is formed between a direction to which the communication target is directed and a boundary of the field of view of the terminal user with respect to the terminal by using the obtained location information of the communication target and mapping the communication target in a screen of the terminal in accordance with a screen size of the terminal using the calculated relative angle of the communication target.

The calculating of the relative angle of the communication target may be carried out by performing an operation on an orientation angle between a reference direction of the terminal and the direction to which the communication target is directed, an orientation angle between the reference direction of the terminal and a direction to which the terminal is directed, and an orientation angle between the boundary of the field of view of the terminal user and the direction to which the terminal is directed.

The mapping of the communication target may include calculating a relative location of the communication terminal to be displayed on the screen of the terminal using the calculated relative angle of the communication terminal, a width of the screen of the terminal and the field of view of the terminal user and mapping an image of the communication target acquired by an image capturing unit of the terminal to the relative location of the communication target and displaying the mapping result.

The method may further comprise setting a starting point at one end of the screen of the terminal, wherein the mapping of the image of the communication target and the displaying of the mapping result comprises displaying the communication target in such a manner that the terminal user can recognize a relative distance of the communication terminal from the set starting point in the screen.

The displaying of the mapping result may further include displaying a border set between communication targets so that the communication targets can be distinguished from each other and the terminal user can select a desired communication target among them.

The method may further include establishing a communication link to the communication target displayed on the screen.

The establishing of the communication link to the communication target may include, if the obtained location information of the communication target includes identification information, establishing the communication link to the communication target using the identification information, and if failing to receive identification information from the communication target, transmitting location information of a communication target from the terminal to a corresponding communication target, if the corresponding communication target confirms that the location information transmitted from the terminal is the same as its location information, receiving identification information from the corresponding communication target, and establishing a communication link to the corresponding communication target using the received identification information.

In another general aspect, there is provided a method of a terminal to recognize a communication target, comprising: acquiring an image of the communication target which is located within a visible range of a terminal user and whose identification information is unknown; obtaining orientation information of the terminal including a direction and an orientation angle of the terminal; issuing a location information request to the communication target and receiving location information of the communication target as a response; and recognizing a relative location of the communication target using the orientation information of the terminal and the location information of the communication target, mapping the recognized relative location of the communication target to the acquired image of the communication target and displaying the mapping result on a screen of the terminal.

The method may further include displaying relative locations of one or more communication targets in a different manner on the screen such that the terminal user can easily recognize the one or more communication targets; receiving a communication target selection instruction from the terminal user to select one from the communication targets displayed on the screen; and establishing a communication link to the communication target selected by the terminal user.

In another general aspect, there is provided a terminal comprising: a sensor configured to acquire orientation information including a direction and an orientation angle of the terminal; a communication unit configured to issue a request for location information to a communication target which is located within a visible range of a terminal user and whose identification information is unknown and receive the location information from the communication target; a control unit configured to recognize a relative location of the communication target using the orientation information of the terminal and the location information of the communication target and map the recognized relative location of the communication target in a screen of the terminal; and an output unit configured to display the mapped relative location of the communication target on the screen.

The control unit may be configured to comprise a location information processing unit configured to set a transmission range based on a reference line of an orientation angle obtained by the sensor, within which a location information request signal can be transmitted, emit the location information request signal within the set transmission range through the communication unit, and obtain and process the location information of the communication target that has received the emitted location information request signal.

The control unit may be configured to further comprise a relative location calculating unit configured to receive the location information of the communication target from the location information processing unit and calculate a relative angle of the communication target formed between a boundary of a field of view of the terminal user and a direction to which the communication target is directed with respect to the terminal using the received location information of the communication target, and mapping unit configured to map the communication target in a screen of the terminal in accordance with a screen size using the calculated relative angle of the communication target.

The relative location calculating unit may be configured to calculate the relative angle of the communication target by performing an operation on an orientation angle between a reference direction of the terminal and the direction to which the communication target is directed, an orientation angle between the reference direction of the terminal and a direction to which the terminal is directed, and an orientation angle between the boundary of the field of view of the terminal user and the direction to which the terminal is directed.

The mapping unit may be configured to calculate the relative location of the communication target to be displayed on the screen by performing an operation on the calculated relative angle of the communication target, a width of the screen of the terminal and the field of view of the terminal user, and map the calculated relative location of the communication target in the screen.

The terminal may further include an image capturing unit configured to acquire an image of the communication target in real time, wherein the relative location calculating unit is configured to recognize the relative location of the communication target whose image is acquired by the image capturing unit and the mapping unit is configured to map the relative location of the communication target recognized by the relative location calculating unit and the image of the communication target acquired by the image capturing unit in the screen of the terminal.

The terminal may further include an input unit configured to receive a communication target selection instruction from the terminal user to select one from communication targets displayed on the screen by the output unit, wherein the output unit displays relative locations of one or more communication targets in a different manner by displaying a border between the one or more communication targets on the screen such that the terminal user can easily select one from the one or more communication targets.

The communication unit may be configured to, if the received location information of the communication target includes identification information, establish a communication link to the communication target using the identification information, and if it fails to receive identification information from the communication target, transmit location information of a communication target to a corresponding communication target, if the corresponding communication target confirms that the location information transmitted from the terminal is the same as its location information, receive identification information from the corresponding communication target, and establish a communication link to the corresponding communication target using the received identification information.

Other features and aspects will be apparent from the following detailed description, the drawings, and the claims.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Figure 1:
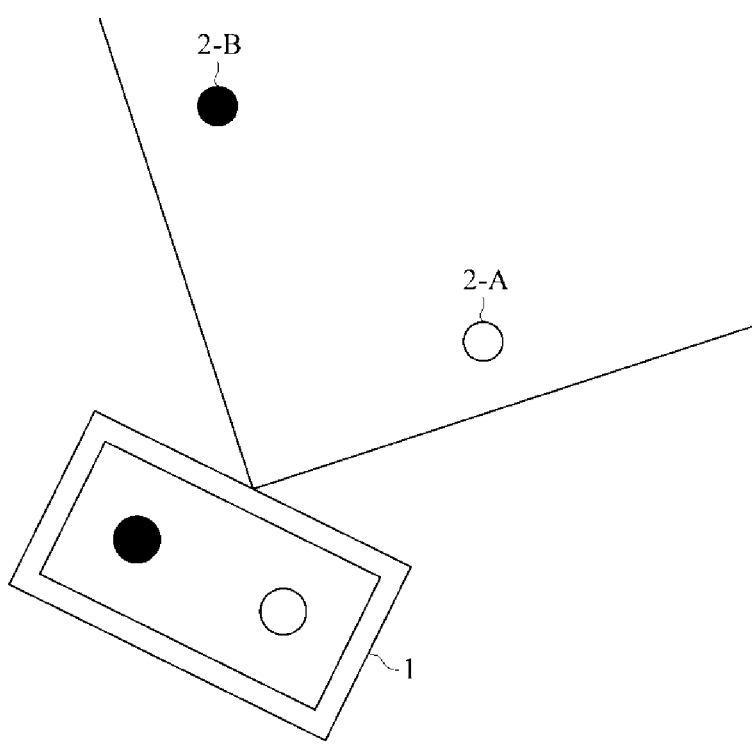
FIG. 1 is a diagram illustrating an example situation where communication target recognition of a user terminal is employed according to an exemplary embodiment of the present invention.

FIG. 1 is a diagram illustrating an example situation where communication target recognition of a user terminal is employed according to an exemplary embodiment of the present invention.

Referring to FIG. 1, a user terminal 1 (hereinafter, simply referred to as a "terminal") uses location information of communication target candidates, device A 2-A and device B 2-B, which are located within a visible range of a user and in a direction in which the terminal 1 faces and identification information of each of which is unknown, to recognize communication targets, displays the recognized communication targets in a different manner, and establish a communication link to the displayed communication target.

The present invention is applicable to any types of location-based service system, such as a global positioning system (GPS), capable of providing location information of a device. In the following description, a case where a device uses a GPS to acquire its location information is described.

Hereinafter, it is assumed that there are three devices, that is, the terminal 1 and the communication target candidates, device A 2-A and device B 2-B, within a communication coverage, as shown in FIG. 1. The terminal 1 may be a handheld device (HD) that can be easily carried by a user. Devices A and B 2-A and 2-B may be existing terminals or any objects capable of communications, for example, vehicles, buildings, or electronic appliances.

The communication environment of the devices is assumed as follows:

- The terminal 1 desires to establish a communication link to device A 2-A. That is, device A 2-A is a communication target of the terminal 1.
- The terminal 1 and device A 2-A do not know each other's identification (ID) information.
- Both devices A and B 2-A and 2-B are able to know their absolute locations using GPS or the like.
- The terminal 1 is able to know its orientation information including a direction in which the terminal 1 faces and an orientation angle using an electronic compass or a sensor with a similar function.
- The terminal 1 includes an image capturing unit and displays an image acquired by the image capturing unit on its screen in real time. The image capturing unit may be a general camera. In the following description, a camera is taken as an example of the image capturing unit, but the type of image capturing unit is not limited thereto.
- The terminal 1 is able to transmit packets in a direction to which a field of view of the camera is directed and within the radius of field-of-view.
- The devices 2-A and 2-B which are located within a visible range of the user of the terminal 1 may transmit packets to other devices within a communication coverage, using broadcast, multicast or unitcast transmission.

Hereinafter, process of transmitting and receiving information (for example, ID information of device B 2-B) required for creating a link with the communication target, device A 2-A, without confusing with device B 2-B under the above assumption is described with reference to FIG. 2.

Figure 2:
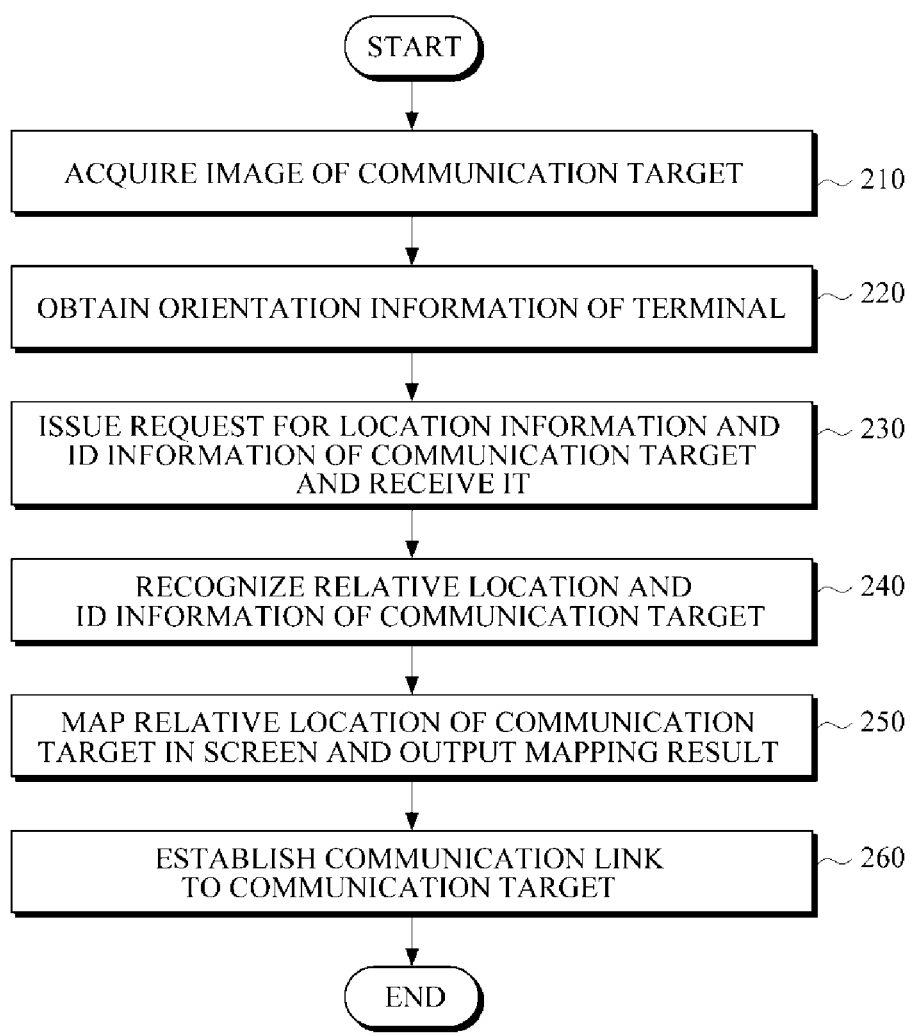
FIG. 2 is a flowchart illustrating a method of a terminal to recognize a communication target according to an exemplary embodiment of the present invention.

FIG. 2 is a flowchart illustrating a method of a terminal to recognize a communication target according to an exemplary embodiment of the present invention.

Referring to FIGS. 1 and 2, the terminal 1 captures an image of device A 2-A to which a communication link is to be established by using a camera in 210.

Then, the terminal 1 obtains orientation information including an orientation angle γ using an orientation sensor such as an electronic compass in 220. The orientation angle γ is an angle between a reference direction of an angle and a direction to which the terminal 1 is directed. The acquisition of the orientation information of the terminal 1 will be described later with reference to FIG. 3.

The terminal 1 emits a location information request signal by beamforming in a direction to which the terminal 1 is directed and within a range of field-of-view of the user in 230. The field of view of the user may be a field of view λ of the camera of the terminal 1 with respect to the direction to which the terminal 1 is directed. A range of distance within which the location information request signal can be transmitted is defined as a user's visible range, and may be specifically set by a manufacturer or the user.

Devices A and B 2-A and 2-B that have received the location information request signal from the terminal 1 obtain their absolute coordinates of current locations. Various methods, such as GPS satellite signals, may be used for the acquisition of the absolute coordinates. Thereafter, devices A and B 2-A and 2-B each transmit a response packet to the terminal 1 without collision, and the terminal 1 receives the response packets in 230. To avoid collision, carrier sense multiple access (CSMA) may be used.

The response packet contains a diversity of information. For example, the response packet may include absolute location coordinates of devices A and B 2-A and 2-B, information θa and θb about angles between the respective devices A and B and a reference direction, unique ID information (cell ID, IP addresses, phone numbers, and the like) of the respective devices A and B 2-A and 2-B, estimated distances γa and γb from the terminal 1 to the respective devices A and B 2-A and 2-B, and device information (available services, device capabilities, and the like) of the respective devices A and B 2-A and 2-B.

The terminal 1 recognizes relative locations of the respective devices A and B 2-A and 2-B using the response packets received from the devices A and B 2-A and 2-B in 240. For example, relative angles θa' and θb' of the respective devices A and B 2-A and 2-B with respect to the right boundary of the field of view of the terminal 1 are calculated based on the absolute location coordinates, an orientation angle γ between a reference direction and the direction to which the terminal 1 is directed, and angles θa and θb formed between the respective devices A and B 2-A and 2-B and the reference direction. The calculation of the relative angles θa' and θb' of the respective devices A and B 2-A and 2-B will be described later with reference to FIG. 4.

Then, the terminal 1 maps the relative locations of devices A and B 2-A and 2-B obtained in 240 to images of devices A and B 2-A and 2-B which are captured by a camera of the terminal 1 and displayed on the terminal's screen, and outputs the mapping result in 250. Detailed mapping process will be described later with reference to FIG. 5.

The terminal 1 then receives a user's input that selects one (for example, device A) of devices A and B 2-A and 2-B based on mapping coordinates. At this time, to facilitate the user's selection, a border between device A 2-A and device B 2-B may be created. The creation of the border will be described later with reference to FIG. 6.

In 260, the terminal 1 establishes a communication link to the device selected by the user. More specifically, if the response packets received by the terminal 1 includes ID information, such as an IP address and phone number, which is additional information of the corresponding device A or B 2-A or 2-B, the terminal 1 establishes a communication link to the selected device using the received ID information.

In contrast, if the terminal 1 has not received the ID information, such as an IP address and phone number, of devices A and B 2-A and 2-B, the terminal 1 transmits location information of the selected device to an area from which the location information request message has been emitted. Devices present in the relevant area compares the location information transmitted from the terminal 1 with its own location information, and if both location information match with each other, transmits its ID information as a response signal to the terminal 1. Then, the terminal 1 establishes a communication link to the device using the received ID information of the device.

Figure 3:
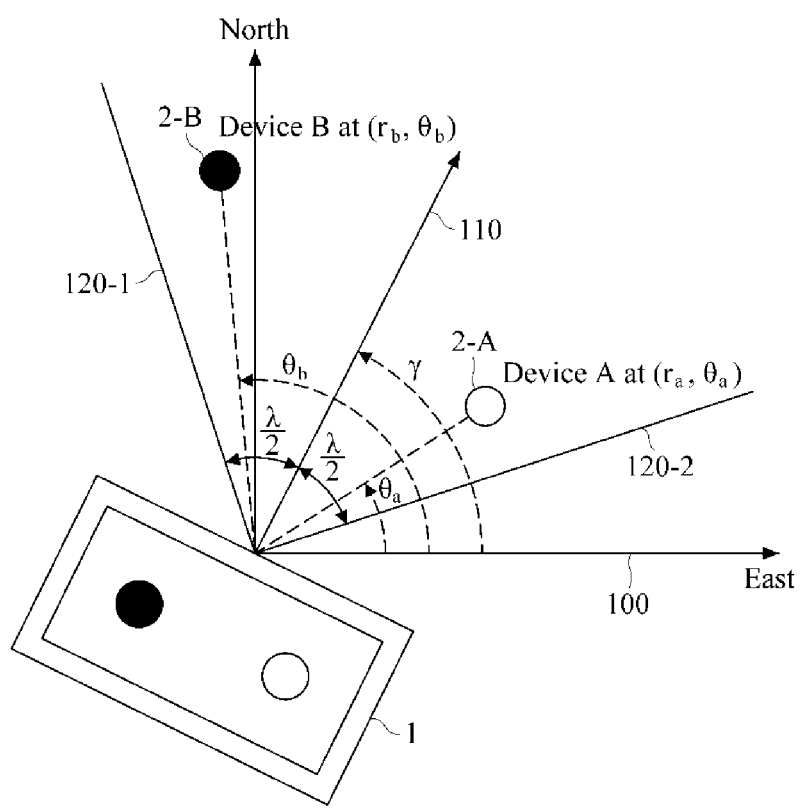
FIG. 3 is a diagram illustrating a visible range and orientation information of a terminal according to an exemplary embodiment of the present invention.

FIG. 3 is a diagram illustrating a visible range and orientation information of a terminal according to an exemplary embodiment of the present invention.

Referring to FIG. 3, a terminal 1 calculates an orientation angle γ formed between a reference direction 100 and a direction 110 to which the terminal 1 is directed by use of an orientation sensor, such as an electronic compass, a gyro sensor and the like. The reference direction 100 is parallel to a line of latitude, and may be, for example, east. The field of view λ of a camera is a range of area that the camera can capture, and ranges from a left boundary 120-1 to a right boundary 120-2. A reference of the orientation sensor may be set to the right boundary 120-2 of the field of view λ of the camera.

Figure 4:
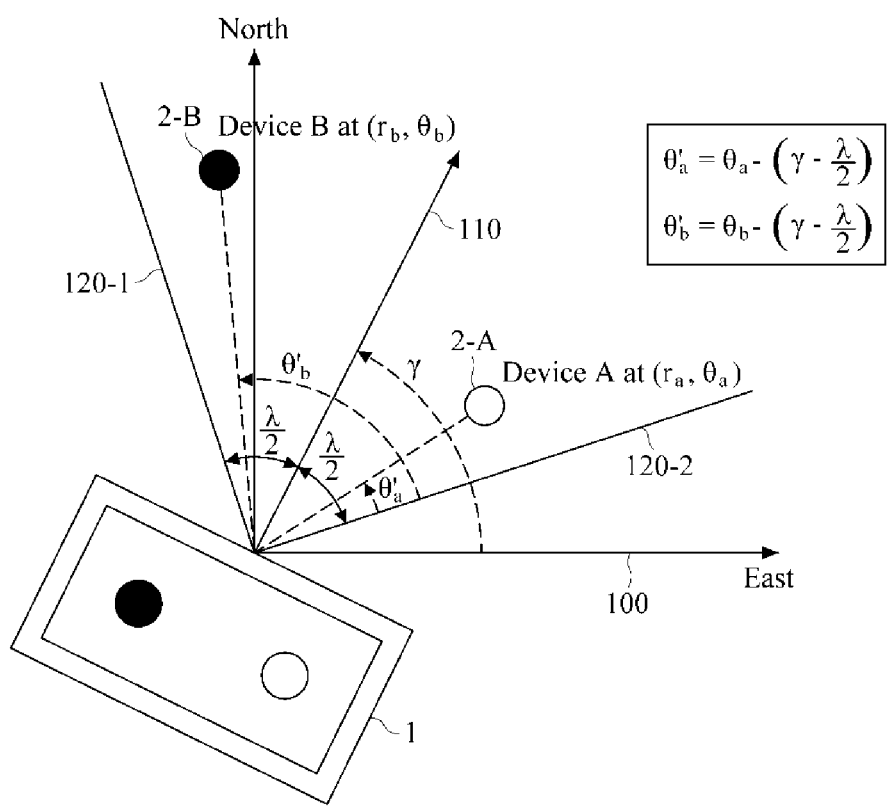
FIG. 4 is a diagram illustrating relative angles of devices A and B according to an exemplary embodiment of the present invention.

FIG. 4 is a diagram illustrating relative angles of devices A and B according to an exemplary embodiment of the present invention.

Referring to FIG. 4, based on location information of devices A and B 2-A and 2-B, the relative angles $\theta_a'$ and $\theta_b'$ of the respective devices A and B 2-A and 2-B are calculated by subtracting a difference between an orientation angle γ between a reference direction 100 of the terminal 1 and a direction 110 to which the terminal 1 is directed and an orientation angle λ/2 between the direction 110 to which the terminal 1 is directed and a boundary 120-2 of the field of view of the user from the respective orientation angles $\theta_a$ and $\theta_b$ between the reference direction 100 and directions to which the respective devices A and B 2-A and 2-B are directed. Such calculations may be represented by Formula 1 and Formula 2 as below.

$$\theta_a^1 = \theta_a - \left(\gamma - \frac{\lambda}{2}\right) \quad (1)$$

$$\theta_b^1 = \theta_b - \left(\gamma - \frac{\lambda}{2}\right) \quad (2)$$

Figure 5:
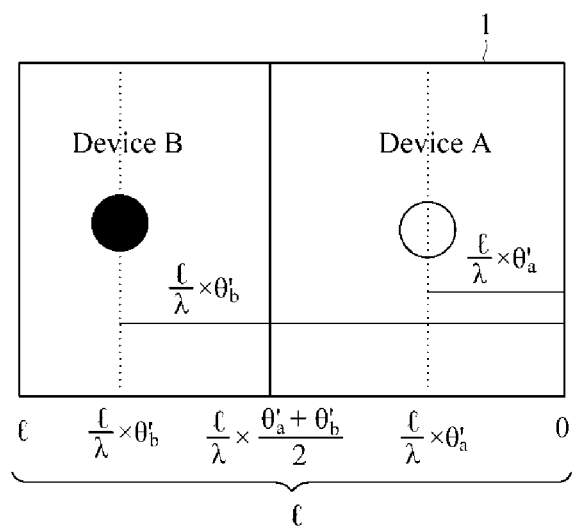
FIG. 5 is a diagram illustrating a screen of a terminal to which a location of a communication target is mapped according to an exemplary embodiment of the present invention.

FIG. 5 is a diagram illustrating a screen of a terminal in which a location of a communication target is mapped according to an exemplary embodiment of the present invention.

Referring to FIG. 5, a terminal 1 captures images of devices A and B 2-A and 2-B using a camera and displays the captured images on a screen. Under the assumption that the width of the terminal screen is measured in centimeters, the images of devices A and B are mapped and displayed on the screen in accordance with a field of view λ of the camera and a ratio of relative angles $\theta_a'$ and $\theta_b'$.

In one example, a relative distance between the respective devices A and B mapped in the terminal screen and the rightmost point of the terminal screen is reduced to 1/λ in accordance with the width 1 of the screen, the field of view λ of the camera and a ratio of relative angles $\theta_a'$ and $\theta_b'$.

As shown in FIG. 5, given that the rightmost point of the screen is set as a starting point 0 of coordinates and the leftmost point is set as 1, which is the width of the screen, the relative locations of devices A and B to be mapped on the screen may be represented as Formula 3 and Formula 4, respectively, as below.

Mapping coordinates of device A:

$$\frac{l}{\lambda} \times \theta_a' \text{ (cm)} \quad (3)$$

Mapping coordinates of device B:

$$\frac{l}{\lambda} \times \theta_b' \text{ (cm)} \quad (4)$$

The above-described method of setting the starting point of the coordinates is provided only for purposes of example, and the coordinates are not limited to start from the rightmost end of the screen.

Figure 6:
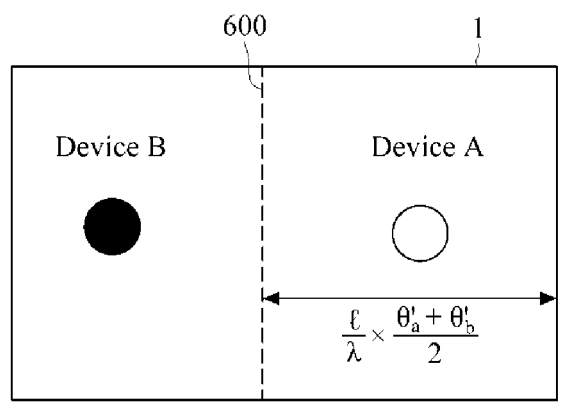
FIG. 6 is a diagram illustrating a screen of a terminal in which a border between devices is set according to an exemplary embodiment of the present invention.

FIG. 6 is a diagram illustrating a screen of a terminal in which a border between devices is set according to an exemplary embodiment of the present invention.

Referring to FIG. 6, the border lth 600 is set to a midpoint between mapped locations of both devices A and B. This may be represented by Formula 5 as below. However, the border lth 600 may be set in various ways.

$$l_{th} = \frac{l}{\lambda} \times \frac{\theta_a' + \theta_b'}{2} \quad (5)$$

If the user selects a region of a terminal screen that includes coordinates corresponding to 0≤x≤lth, process for establishing a communication link to device A is performed. If the user selects a region of the terminal screen that includes coordinates corresponding to lth≤x≤1, process for establishing a communication link to device B is performed.

Figure 7:
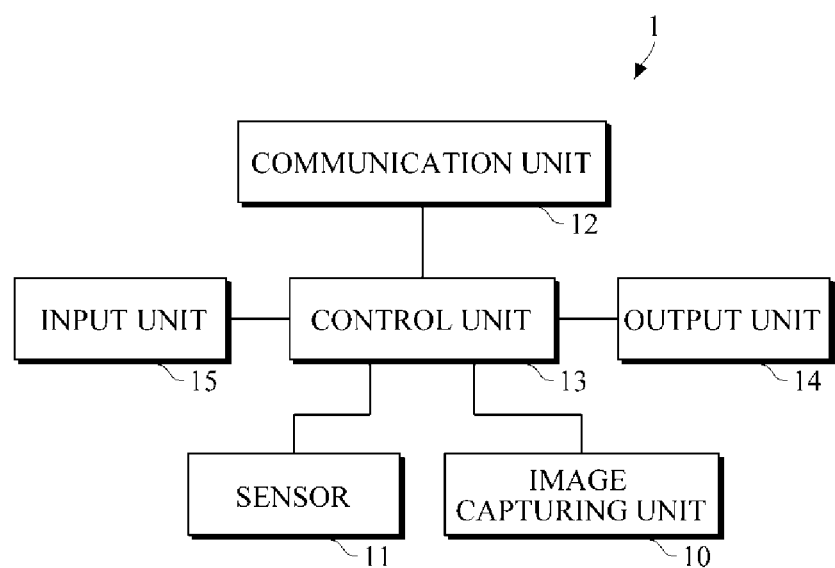
FIG. 7 is diagram illustrating a configuration of a terminal according to an exemplary embodiment of the present invention.

FIG. 7 is diagram illustrating a configuration of a terminal according to an exemplary embodiment of the present invention.

Referring to FIGS. 1 and 7, the terminal 1 includes an image capturing unit 10, a sensor 11, a communication unit 12, a control unit 13, an output unit 14, and an input unit 15.

The sensor 11 obtains orientation information of the terminal 1 including a direction and an orientation angle of the terminal 1. The sensor 11 may be an orientation sensor, such as an electronic compass, a gyro sensor, or the like.

The image capturing unit 10 acquires images of devices A and B in real time. The image capturing unit 10 may be generally a camera. A field of view of the image capturing unit 10 within which images of devices A and B can be acquired may be set as a visible range of a user of the terminal 1.

The communication unit 12 transmits a location information request signal to communication target candidates, which are devices A and B whose ID information are unknown, within the visible range of the terminal user, and receives the location information from devices A and B.

The control unit 13 identifies relative locations of devices A and B using the orientation information of the terminal 1 obtained by the sensor 11 and the location information of devices A and B obtained by the communication unit 12, and maps the identified relative locations to a screen of the terminal 1. The control unit 13 may recognize the relative locations of devices A and B of which images are acquired by the image capturing unit 10, and map the recognized relative locations of devices A and B and the images of devices A and B.

The output unit 14 displays the mapped relative locations of devices A and B on the screen. The output unit 14 may display a border between the devices so as to assist the user's selection of a device when displaying the relative locations of devices A and B on the screen.

The input unit 15 receives an instruction from the user. In particular, the input unit 15 may receive a selection instruction to select a communication target from among the communication target candidates.

The communication unit 12 establishes a communication link to the communication target selected from devices A and B whose relative locations are displayed through the output unit 14. In one example, in response to receiving ID information of the communication target, the communication unit 12 establishes the communication link to the communication target using the received ID information. Alternatively, when failing to receive ID information from the communication target, the communication unit 12 transmits location information of a communication target to the corresponding communication target. A terminal which has received the location information as the corresponding communication target checks whether the received location information matches with its own location information, and transmits its ID information as a response to the communication unit 12. Then, the communication unit 12 establishes a communication link to the terminal using the received ID information.

Figure 8:
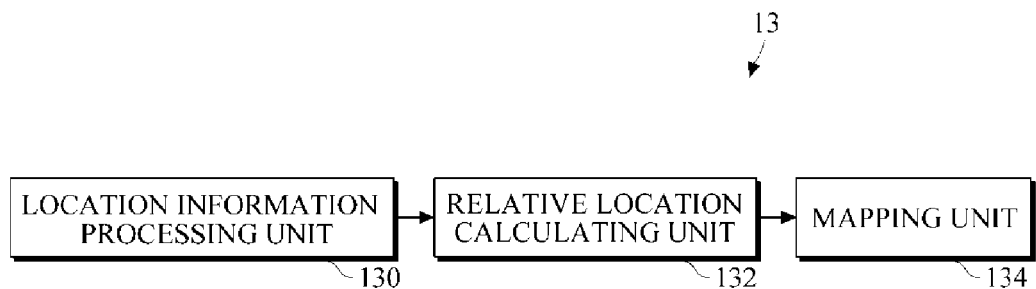
FIG. 8 is a diagram illustrating a configuration of the control unit of FIG. 7.

FIG. 8 is a diagram illustrating a configuration of the control unit of FIG. 7.

Referring to FIG. 8, the control unit 13 includes a location information processing unit 130, a relative location calculating unit 132 and a mapping unit 134.

Referring to FIGS. 7 and 8, the location information processing unit 130 sets a transmission range, within which a location information request signal can be transmitted, based on a reference line of the orientation angle obtained by the sensor 11. Then, the location information processing unit 130 emits a location information request signal within the set transmission range through the communication unit 12, receives location information of devices A and B which have received the location information request signal, and processes the received location information.

The relative location calculating unit 132 calculates relative angles of communication target candidates, which are formed between a boundary of a field of view of the user of the terminal 1 and each direction to which each of devices A and B is directed using the location information of the respective devices A and B. In one example, based on the location information of the respective devices A and B, the relative location calculating unit 132 calculates the relative angles of the respective devices A and B by performing an operation on an orientation angle between the reference direction of the terminal 1 and each direction to each of devices A and B is directed, an orientation angle between the reference direction of the terminal 1 and a direction to which the terminal 1 is directed, and an orientation angle between the boundary of the field of view of the user and the direction to which the terminal 1 is directed.

The mapping unit 134 maps the respective devices A and B in the screen according to the screen size of the terminal, using the calculated relative angles of devices A and B. In one example, the mapping unit 134 may calculate relative locations of the respective devices A and B to be displayed on the screen by performing an operation on the relative angle of the communication target obtained by the relative location calculating unit 132, a screen width of the terminal 1 and the field of view of the user, and map the calculated relative locations of the respective devices A and B in the screen.

As described above, according to the exemplary embodiments of the present invention, by using orientation information of a terminal and location information of communication target candidates whose ID information are unknown in the user's visible range, relative locations of the communication target candidates are identified and the identified relative locations of the communication target candidates are displayed on a screen in a different manner, so that a user is enabled to select a communication target while viewing the communication target candidates, which are present within the visible range of the user, on the screen. Thus, the user is allowed to select the communication target more intuitively, compared to the existing communication system, such as a cell-ID, IP addresses, and phone numbers, and to establish a communication link to the selected communication target.

In addition, it is possible to use location information instead of ID information that is required, in advance, for establishing an initial link between devices in an existing communication system, and also to selectively provide information about devices within a particular range in a visible range to a user to assist the user's selection.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of a terminal to recognize a communication target, comprising:
   obtaining location information of a communication target which is located within a visible range of a terminal user and whose identification information is unknown; and recognizing a relative location of the communication target with respect to the terminal based on the obtained location information and displaying the recognized relative location of the communication target, wherein the displaying of the recognized relative location of the communication target comprises calculating relative angle θa' of the communication target, wherein the relative angle θa' is calculated by subtracting a difference between an orientation angle γ, which is between a reference direction of the terminal and a direction to which the terminal is directed, and an orientation angle λ/2, which is between the direction to which the terminal is directed and a boundary of a field of view of the user, from a respective orientation angle $θ_a$, which is between the reference direction and the direction to which the communication target is directed.

2. The method of claim 1, wherein the obtaining of the location information of the communication target comprises calculating an orientation angle between the reference direction and the direction to which the terminal is directed, setting a transmission range based on a reference line of the calculated is orientation angle, within which a location information request signal is transmitted, and emitting the location information request signal within the transmission range and receiving the location information of the communication target that has received the emitted request signal.

3. The method of claim 2, wherein the setting of the transmission range comprises setting the field of view of an image capturing unit of the terminal, which is the field of view of the terminal user and within which the image capturing unit can acquire an image of the communication target, as the transmission range.

4. The method of claim 1, wherein the displaying of the recognized relative location of the communication target comprises calculating a relative angle of the communication target that is formed between a direction to which the communication target is directed and the boundary of the field of view of the terminal user with respect to the terminal by using the obtained location information of the communication target and mapping the communication target in a screen of the terminal in accordance with a screen size of the terminal using the calculated relative angle of the communication target.

5. The method of claim 4, wherein the calculating of the relative angle of the communication target is carried out by performing an operation on the orientation angle between the reference direction of the terminal and the direction to which the communication target is directed, the orientation angle between the reference direction of the terminal and the direction to which the terminal is directed, and the orientation angle between the boundary of the field of view of the terminal user and the direction to which the terminal is directed.

6. The method of claim 4, wherein the mapping of the communication target comprises calculating the relative location of the communication terminal to be displayed on the screen of the terminal using the calculated relative angle of the communication terminal, a width of the screen of the terminal and the field of view of the terminal user and mapping an image of the communication target acquired by an image capturing unit of the terminal to the relative location of the communication target and displaying the mapping result.

7. The method of claim 6, further comprising: setting a starting point at one end of the screen of the terminal, wherein the mapping of the image of the communication target and the displaying of the mapping result comprises displaying the communication target in such a manner that the terminal user can recognize a relative distance of the communication terminal from the set starting point in the screen.

8. The method of claim 4, wherein the displaying of the mapping result further comprises displaying a border set between communication targets so that the communication targets can be distinguished from each other and the terminal user can select a desired communication target among them.

9. The method of claim 1, further comprising: establishing a communication link to the communication target displayed on the screen.

10. The method of claim 9, wherein the establishing of the communication link to the communication target comprises, if the obtained location information of the communication target includes identification information, establishing the communication link to the communication target using the identification information, and if failing to receive identification information from the communication target, transmitting location information of a communication target from the terminal to a corresponding communication target, if the corresponding communication target confirms that the location information transmitted from the terminal is the same as its location information, receiving identification information from the corresponding communication target, and establishing a communication link to the corresponding communication target using the received identification information.

11. A method of a terminal to recognize a communication target, comprising:
acquiring an image of the communication target which is located within a visible range of a terminal user and whose identification information is unknown;
obtaining orientation information of the terminal including a direction and an orientation angle of the terminal;
issuing a location information request to the communication target and receiving location information of the communication target as a response; and
recognizing a relative location of the communication target using the orientation information of the terminal and the location information of the communication target, mapping the recognized relative location of the communication target to the acquired image of the communication target, and displaying the mapping result on a screen of the terminal,
wherein displaying the mapping result of mapping the recognized relative location of the communication target comprises calculating relative angle θa' of the communication target,
wherein the relative angle θa' is calculated by subtracting a difference between an orientation angle γ, which is between a reference direction of the terminal and a direction to which the terminal is directed, and an orientation angle λ/2, which is between the direction to which the terminal is directed and a boundary of a field of view of the user, from a respective orientation angle $θ_a$, which is between the reference direction and the direction to which the communication target is directed.

12. The method of claim 11, further comprising: displaying relative locations of one or more communication targets in a different manner on the screen such that the terminal user can easily recognize the one or more communication targets; receiving a communication target selection instruction from the terminal user to select one from the communication targets displayed on the screen; and establishing a communication link to the communication target selected by the terminal user.

13. A terminal comprising:
a sensor configured to acquire orientation information including a direction and an orientation angle of the terminal;

a communication unit configured to issue a request for location information to a communication target which is located within a visible range of a terminal user and whose identification information is unknown and receive the location information from the communication target;

a control unit configured to recognize a relative location of the communication target using the orientation information of the terminal and the location information of the is communication target and map the recognized relative location of the communication target in a screen of the terminal; and an output unit configured to display the mapped relative location of the communication target on the screen, wherein to display the recognized relative location of the communication target, a relative angle θa' of the communication target is calculated, wherein the relative angle θa' is calculated by subtracting a difference between an orientation angle γ, which is between a reference direction of the terminal and a direction to which the terminal is directed, and an orientation angle λ/2, which is between the direction to which the terminal is directed and a boundary of a field of view of the user, from a respective orientation angle $\theta_a$, which is between the reference direction and the direction to which the communication target is directed.

14. The terminal of claim 13, wherein the control unit is configured to comprise a location information processing unit configured to set a transmission range based on a reference line of the orientation angle obtained by the sensor, within which a location information request signal can be transmitted, emit the location information request signal within the set transmission range through the communication unit, and obtain and process the location information of the communication target that has received the emitted location information request signal.

15. The terminal of claim 14, wherein the control unit is configured to further comprise the relative location calculating unit configured to receive the location information of the communication target from the location information processing unit and calculate a relative angle of the communication target formed between the boundary of the field of view of the terminal user and the direction to which the communication target is directed with respect to the terminal using the received location information of the communication target, and mapping unit configured to map the communication target in the screen of the terminal in accordance with a screen size using the calculated relative angle of the communication target.

16. The terminal of claim 15, wherein the relative location calculating unit is configured to calculate the relative angle of the communication target by performing an operation on the orientation angle between the reference direction of the terminal and the direction to which the communication target is directed, the orientation angle between the reference direction of the terminal and the direction to which the terminal is directed, and the orientation angle between the boundary of the field of view of the terminal user and the direction to which the terminal is directed.

17. The terminal of claim 15, wherein the mapping unit is configured to calculate the relative location of the communication target to be displayed on the screen by performing an operation on the calculated relative angle of the communication target, a width of the screen of the terminal and the field of view of the terminal user, and map the calculated relative location of the communication target in the screen.

18. The terminal of claim 15, further comprising: an image capturing unit configured to acquire an image of the communication target in real time, wherein the relative location calculating unit is configured to recognize the relative location of the communication target whose image is acquired by the image capturing unit and the mapping unit is configured to map the relative location of the communication target recognized by the relative location calculating unit and the image of the communication target acquired by the image capturing unit in the screen of the terminal.

19. The terminal of claim 13, further comprising: an input unit configured to receive a communication target selection instruction from the terminal user to select one from communication targets displayed on the screen by the output unit, wherein the output unit displays relative locations of one or more communication targets in a different manner by displaying a border between the one or more communication targets on the screen such that the terminal user can easily select one from the one or more communication targets.

20. The terminal of claim 13, wherein the communication unit is configured to, if the received location information of the communication target includes identification information, establish a communication link to the communication target using the identification information, and if it fails to receive identification information from the communication target, transmit location information of a communication target to a corresponding communication target, if the corresponding communication target confirms that the location information transmitted from the terminal is the same as its location information, receive identification information from the corresponding communication target, and establish a communication link to the corresponding communication target using the received identification information.

* * * * *